(12) United States Patent
Itami et al.

(10) Patent No.: US 9,242,902 B2
(45) Date of Patent: Jan. 26, 2016

(54) NONLINEAR RESISTOR CERAMIC COMPOSITION AND ELECTRONIC COMPONENT

(75) Inventors: Takahiro Itami, Tokyo (JP); Kaname Ueda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 479 days.

(21) Appl. No.: 13/078,237

(22) Filed: Apr. 1, 2011

(65) Prior Publication Data

US 2011/0245065 A1    Oct. 6, 2011

(30) Foreign Application Priority Data

| Apr. 5, 2010 | (JP) | 2010-087191 |
| Apr. 5, 2010 | (JP) | 2010-087192 |
| Mar. 7, 2011 | (JP) | 2011-049215 |

(51) Int. Cl.
  $C04B\ 35/50$    (2006.01)
  $C04B\ 35/453$   (2006.01)

(52) U.S. Cl.
  CPC ....... *C04B 35/453* (2013.01); *C04B 2235/3208* (2013.01); *C04B 2235/3213* (2013.01); *C04B 2235/3224* (2013.01); *C04B 2235/3225* (2013.01); *C04B 2235/3227* (2013.01); *C04B 2235/3229* (2013.01); *C04B 2235/3248* (2013.01); *C04B 2235/3275* (2013.01); *C04B 2235/3284* (2013.01); *C04B 2235/3418* (2013.01); *C04B 2235/6025* (2013.01); *C04B 2235/656* (2013.01); *C04B 2235/786* (2013.01)

(58) Field of Classification Search
  CPC .................................. H01C 7/105; H01T 1/16
  USPC ....................................... 338/20, 21; 501/152
  See application file for complete search history.

(56) References Cited

U.S. PATENT DOCUMENTS

| 7,969,277 B2 * | 6/2011 | Matsuoka ........................ 338/21 |
| 2009/0015367 A1 * | 1/2009 | Matsuoka ........................ 338/21 |

FOREIGN PATENT DOCUMENTS

| CN | 101345105 A |   | 1/2009 |
| DE | 3134584     | * | 3/1983 |
| JP | 54-025494   | * | 7/1977 |
| JP | A-2002-246207 |   | 8/2002 |
| JP | 2005-263508 | * | 9/2005 |
| JP | A-2009-246335 |   | 10/2009 |
| JP | A-56-140602 |   | 11/2011 |

* cited by examiner

*Primary Examiner* — Monique Peets
(74) *Attorney, Agent, or Firm* — Oliff PLC (57) ABSTRACT

A nonlinear resistor ceramic composition includes zinc oxide as main component, and, as subcomponents, with respect to 100 mol of zinc oxide in terms of respective elements, more than 0.05 to less than 30 at. % of oxide of Co, more than 0.05 to less than 20 at. % of oxide of Sr, more than 0.01 to less than 20 at. % of oxides of rare earth except for Sc and Pm, more than 0.01 to less than 10 at. % of oxide of Si and does not include Al, Ga and In. Alternatively, a nonlinear resistor ceramic composition includes zinc oxide as main component, and, as subcomponents, with respect to 100 mol of zinc oxide in terms of respective elements, more than 0.05 at. % and less than 30 at. % of an oxide of Co, more than 0.05 to less than 20 at. % of oxide of Sr, more than 0.01 to less than 20 at. % of oxides of rare earth except for Sc and Pm, more than 0.01 to less than 10 at. % of oxide of Si and more than 0.01 to less than 10 at. % of calcium zirconate in terms of $CaZrO_3$. By the present invention, deviations of various characteristics can be made small and grain growth of grains is suppressed with lowering CV product.

6 Claims, 7 Drawing Sheets

NONLINEAR RESISTOR CERAMIC COMPOSITION AND ELECTRONIC COMPONENT

BACKGROUND OF THE INVENTION

1. Field of the Invention

The present invention relates to a nonlinear resistor ceramic composition suitably used for, for example, a nonlinear resistor layer of a multilayer chip varistor, and an electronic component in which said nonlinear resistor ceramic composition is used as the nonlinear resistor layer.

2. Description of the Related Art

A varistor as an example of an electronic component having a nonlinear resistor layer is used, for example, to absorb or remove an external surge (an abnormal voltage) such as a static electricity or so or a noise, and to protect IC circuits of electronic apparatuses or so.

Recently, the digital signal has become faster and the communication speed has become faster. Particularly, when the varistor is used in the extremely high speed signal line such as HDMI and a capacitance of the varistor is large, the transmitted signal is attenuated due to this capacitance, as a result, the transmitted signal becomes blurry; hence there are problems that the precise transmission is interfered.

Also, since the driving voltage of the circuits has become lowered, thus when the varistor voltage is high, there are problems that the surge and the noise cannot be suppressed so that it was impossible to protect the circuits.

Therefore, in order to attain the precise signal transmission with suppressing the surge and the noise in low voltage driving circuit, the varistor having small capacitance and low varistor voltage is demanded, that is, the varistor having small product of the capacitance "C" and the varistor voltage "V" (CV product) is demanded.

JP Patent laid open No. 2002-246207 discloses a nonlinear resistor including ZnO as a main component, and, as subcomponents, Pr, Co, Cr, Al or so, Si, Ca and Sr in specific ratio. However, JP Patent laid open No. 2002-246207 does not describe a capacitance of the resistor with nonlinear voltage characteristic, thus it is not clear whether the CV product can be made small.

BRIEF SUMMARY OF THE INVENTION

The objective of the present invention is to provide a nonlinear resistor ceramic composition which has low CV product and is able to make deviations of various characteristics smaller, furthermore to suppress the grain growth of grains; and an electronic component such as a multilayer chip varistor in which said composition is used.

In order to attain the above object, a nonlinear resistor ceramic composition according to a first aspect of the present invention includes a zinc oxide as a main component; and, as subcomponents, with respect to 100 mmol of the zinc oxide, more than 0.05 at. % and less than 30 at. % of an oxide of Co in terms of Co; more than 0.05 at. % and less than 20 at. % of an oxide of Sr in terms of Sr; more than 0.01 at. % and less than 20 at. % of an oxide of R in terms of R, where R is at least one element selected from Y, La, Ce, Pr, Nd, Sm, Eu, Gd, Tb, Dy, Ho, Er, Tm, Yb and Lu; more than 0.01 at. % and less than 10 at. % of an oxide of Si in terms of Si; and does not include Al, Ga and In.

In the first aspect of the present invention, by having the above mentioned specific composition and the contents, particularly by including the oxide of Si and not including Al or so, various characteristics can be made good with reducing deviations of the characteristics, and furthermore the grain growth of the grains can be suppressed.

A nonlinear resistor ceramic composition according to a second aspect of the present invention includes a zinc oxide as a main component; and, as subcomponents, with respect to 100 mol of the zinc oxide, more than 0.05 at. % and less than 30 at. % of an oxide of Co in terms of Co; more than 0.05 at. % and less than 20 at. % of an oxide of Sr in terms of Sr; more than 0.01 at. % and less than 20 at. % of an oxide of R in terms of R, where R is at least one element selected from Y, La, Ce, Pr, Nd, Sm, Eu, Gd, Tb, Dy, Ho, Er, Tm, Yb and Lu; more than 0.01 at. % and less than 10 at. % of an oxide of Si in terms of Si; and more than 0.01 at. % and less than 10 at. % of calcium zirconate in terms of $CaZrO_3$.

In the second aspect of the present invention, by having the above mentioned specific composition and the contents, particularly by including the oxide of Si and the calcium zirconate, various characteristics can be made good with suppressing the grain growth of the grains, and further deviations of the characteristics can be reduced.

An electronic component according to the present invention has a nonlinear resistor layer constituted by any one of the above mentioned nonlinear resistor ceramic composition.

As for the electronic component according to the present invention, although it is not particularly limited, a multilayer chip varistor, a disk varistor and a varistor composite element or so are exemplified.

DETAILED DESCRIPTION OF THE INVENTION

Hereinafter the present invention will be described based on the embodiment shown in the figures.

The First Embodiment

Multilayer Chip Varistor

Figure 1:
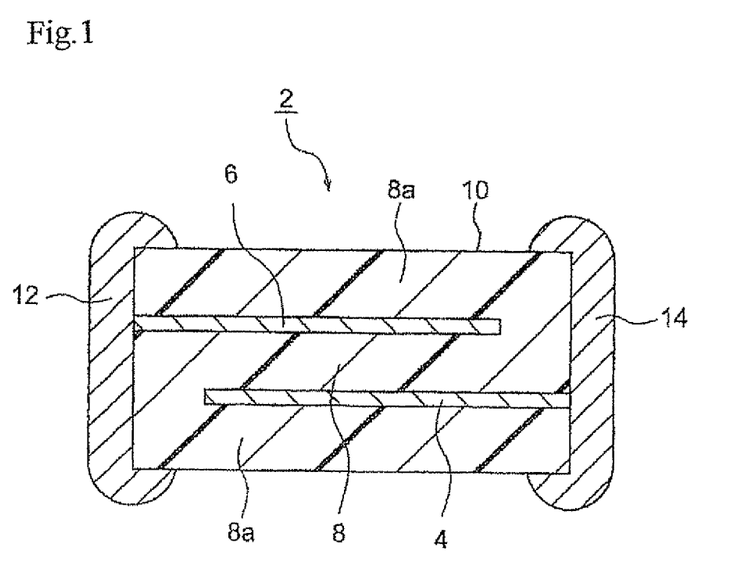
FIG. 1 is a cross section of a multilayer chip varistor according to an embodiment of the present invention.

As shown in FIG. 1, a multilayer chip varistor 2 as an example of an electronic component has an element body 10 constituted by stacking internal electrode layers 4 and 6, an interlayer nonlinear resistor layer 8 and external protection layers 8a. At both ends of the element body 10, a pair of external terminal electrodes 12 and 14 are formed which conducts respectively with the internal electrode layers 4 and 6 placed in the element body 10. Although a shape of the element body 10 is not particularly limited, usually it is rectangular parallelepiped shape. Also, although a size is not particularly limited, it can be a suitable size depending on the use, usually it is length (0.6 to 5.6 mm)×width (0.3 to 5.0 mm)×thickness (0.3 to 1.9 mm) or so.

The internal electrode layers 4 and 6 are stacked so that each end surface is exposed to surfaces of opposing two end portions of the element body 10. The pair of external terminal electrodes 12 and 14 is formed at the both end portions of the element body 10, and are connected to the exposed end surface of the internal electrodes layer 4 and 6 respectively; thereby the circuit is constituted.

In the element body 10, at the both external end portions in the stacking direction of the internal electrode layers 4 and 6, and the interlayer nonlinear resistor layer 8, the external protection layers 8a are arranged to protect an inside of the element body 10. A material of the external protection layer 8a may be the same as the interlayer nonlinear resistor layer 8 or it may be different.

(Internal Electrode Layer)

Although a conductive material included in the internal electrode layers 4 and 6 is not particularly limited, it is preferably constituted by Pd or Ag—Pd alloy. A content of Pd in the alloy is preferably 95 wt % or more. Although a thickness of the internal electrode layers 4 and 6 may be determined depending on the use, usually it is 0.5 to 5 μm or so.

(External Terminal Electrodes)

Although a conductive material included in the external terminal electrodes 12 and 14 is not particularly limited, usually Ag or Ag—Pd alloy is used. Although a thickness of the external terminal electrodes 12 and 14 may be determined depending on the use, it is usually 10 to 50 μm or so.

(Interlayer Nonlinear Resistor Layer)

The interlayer nonlinear resistor layer 8 is constituted by a nonlinear resistor ceramic composition according to the present embodiment. The nonlinear resistor ceramic composition includes a zinc oxide as the main component, and an oxide of Co, an oxide of Sr, an oxide of R and an oxide of Si as subcomponents, but does not include Al, Ga and In.

Zinc oxide (ZnO) as the main component acts as the substance which exhibits an excellent nonlinear voltage characteristic in voltage-current characteristic and the large surge withstand current.

The oxide of Co functions as the acceptor (the electron capture), and acts as the substance which maintains the nonlinear voltage characteristic. A content of the oxide of Co with respect to 100 mol of zinc oxide in terms of Co is more than 0.05 at. % and less than 30 at. %, preferably 0.1 to 20 at. %, and more preferably 0.1 to 10 at. %.

When the content of the oxide of Co is too little, a varistor characteristic tends to become difficult to obtain, and when it is too much, a varistor voltage increases and the nonlinear voltage characteristic tends to decline.

The oxide of Sr functions as the acceptor (the electron capture), and acts as the substance which maintains the nonlinear voltage characteristic. A content of the oxide of Sr with respect to 100 mol of zinc oxide in terms of Sr is more than 0.05 at. % and less than 20 at. %, preferably 0.1 to 10 at. %, and more preferably 0.1 to 5 at. %.

When the content of the oxide of Sr is too little, the CV product (the product of the capacitance "C" and the varistor voltage "V") tends to become large, and when it is too much, the oxide of Sr tends to easily react with zinc oxide thus it tends to melt when firing temperature is high.

The oxide of R acts as the substance which advances diffusion rate of the oxygen into the grain boundary. By adding this, a sintered body can be sintered sufficiently.

As for the R element constituting the oxide of R, Sc and Pm are excluded, and it is preferably at least one selected from Y, La, Ce, Pr, Nd, Sm, Eu, Gd, Tb, Dy, Ho, Er, Tm, Yb and Lu; and more preferably includes at least Pr. A content of the oxide of R with respect to 100 mol of zinc oxide in terms of R is more than 0.01 at. % and less than 20 at. %, preferably 0.05 to 10 at. %, and more preferably 0.1 to 5 at. %.

By setting the content of the oxide of R within the above range, the composition can be maintained at semiconductor state with advancing the diffusion rate of the oxygen into the grain boundary.

The oxide of Si has an effect to reduce deviations of various characteristics (for example, the capacitance, the varistor voltage, the nonlinear coefficient and the like) without changing the CV product, and further it also has an effect to suppress the grain growth of the grains as well. By reducing the deviations of characteristics, a yield rate of the product can be increased.

A content of the oxide of Si with respect to 100 mol of zinc oxide in terms of Si is more than 0.01 at. % and less than 10 at. %, preferably 0.05 at. % to 5 at. %, and more preferably 0.05 at. % to 1 at. %.

When the content of the oxide of Si is too little, an abnormal grain growth of the grains occurs, thus a size of the grains becomes non-uniformly. As a result, good varistor characteristic may not be obtained. On the other hand, when the content of the oxide of Si is too much, the varistor voltage becomes large and the nonlinear voltage characteristic tends to decline.

Note that, as for the production method of the multilayer chip varistor, which will be described in below, when a printing method or a sheet method are employed, the content of the oxide of Si is preferably 5 at. % or less.

Also, the nonlinear resistor ceramic composition according to the present embodiment does not include Al, Ga and In. When these elements are included, the capacitance increases so that the CV product becomes large, which is not preferable.

Note that in the present description, the varistor voltage is determined as the voltage at the time when 1 mA of the electrical current flaws in the varistor. Also, the varistor characteristic (the nonlinear voltage characteristic) is a phenomenon that the electrical current flowing in the element increases nonlinearly when the gradually increasing voltage is applied to the electronic component.

A thickness of the interlayer nonlinear resistor layer 8 or the number of stacked layers or so may be determined depending on the purpose or the use. In the present embodiment, the thickness of the interlayer nonlinear resistor layer 8 is, for example, 5 to 100 μm or so, and the numbers of stacked layers are 10 to 50 or so. Also, a thickness of the external protection layer 8a is, for example, 100 to 500 μm or so.

In the present embodiment, the following characteristics can be attained by determining the composition of the nonlinear resistor ceramic composition as mentioned above. That is, the CV product as the product of the capacitance (C) which is measured at reference temperature of 25° C. with the measuring frequency of 1 MHz and the input signal level (the measuring voltage) of 1 Vrms, and the varistor voltage (V) which is measured at the time when 1 mA of the electrical current flows, can be set to preferably 1700 or less, more preferably 1500 or less, and further preferably 1300 or less. Also, the nonlinear coefficient ($\alpha$) can be set to preferably 14 or more, more preferably 15 or more, and further preferably 17 or more.

(Production Method of the Multilayer Chip Varistor)

Next, an example of the production method of the multilayer chip varistor 2 according to the present embodiment will be described.

In the present embodiment, the multilayer chip varistor 2 is produced by producing a green chip by a normal printing method or a sheet method using a paste, and firing thereof, and baking after printing or transferring an external terminal electrode. Hereinafter the production method will be described in detail.

First, a paste of nonlinear resistor layer, an internal electrode layer paste and an external terminal electrode paste are prepared, respectively. A material of nonlinear resistor (a powder of nonlinear resistor ceramic composition) is prepared and made into a paste so as to prepare the paste of nonlinear resistor layer.

The paste of nonlinear resistor layer may be an organic type paste obtained by kneading the material of the nonlinear resistor and an organic vehicle, or it may be water-based paste.

As for the material of the nonlinear resistor, the oxides of the above mentioned main component and subcomponents, the mixture thereof or the composite oxides thereof may be used. Also, various compounds which become the above mentioned oxides or composite oxides by firing, for example, those suitably selected from carbonate, oxalate, nitrate, hydroxide, organic metal compound or so, and mixtures thereof may be used.

A content of each component in the material of the nonlinear resistor may be determined so as to be composition of the above mentioned nonlinear resistor ceramic composition after firing. As for these material powders, usually those having the average particle diameter of 0.3 to 2 μm or so are used.

The organic vehicle is obtained by dissolving a binder in an organic solvent. The binder used for the organic vehicle is not particularly limited, and it may be suitably selected from various normal binders such as ethyl cellulose, polyvinyl butyral or so. The organic solvent is also not particularly limited, it may be suitably selected from various organic solvents such as terpineol, butyl carbitol, acetone, toluene or so depending on the methods such as the printing method or the sheet method.

Also, when preparing the paste of nonlinear resistor layer as water-based paste, a water-based vehicle obtained by dissolving a water soluble binder and a dispersing agent or so in water, and the dielectric material may be kneaded. The water soluble binder is not particularly limited, for example, polyvinyl alcohol, cellulose, water soluble acrylic resin or so may be used.

An internal electrode layer paste is prepared by kneading the above mentioned various conductive materials or the various oxides, the organic metal compounds or resinate or so which become the above mentioned conductive materials after firing, and the above mentioned organic vehicle. Also, the external terminal electrode paste may be prepared as similar with this internal electrode layer paste.

A content of the organic vehicle in the above mentioned each paste is not particularly limited, and may be normal content, for example, it may be 1 to 5 wt % or so of the binder, and 10 to 50 wt % or so of the solvent. Also, if needed, additives selected from various dispersant agents, plasticizers, dielectrics and insulators or so may be included in each paste. A total content of these are preferably 10 wt % or less.

When using the printing method, a green external protection later 8a is formed by printing the paste of nonlinear resistor layer for plurality of times in the predetermined thickness on the substrate such as PET or so.

Next, on this external protection layer 8a, the internal electrode layer paste is printed in a predetermined pattern so that a green internal electrode layer 4 is formed. Next, on this internal electrode layer 4, the paste of nonlinear resistor layer is printed for plurality of times in the predetermined thickness as similar to the above mentioned, thereby a green interlayer nonlinear resistor layer 8 is formed.

Next, on the interlayer nonlinear resistor layer 8, the internal electrode layer paste is printed in a predetermined pattern so that a green internal electrode layer 6 is formed. The internal electrode layers 4 and 6 are printed so that these oppose against each other and the end portions of thereof are exposed to the surface.

Lastly, on the internal electrode layer 6, as similar to the above mentioned, the paste of nonlinear resistor layer is printed for plurality of times in the predetermined thickness; thereby a green external protection layer 8a is formed. Then formed stack is pressed with heating to be adhered by pressure, then cutting the formed stack to a predetermined shape. After that, a green chip is obtained by removing from the substrate.

Also, when using the sheet method, a green sheet is formed by using the paste of nonlinear resistor layer. Then, the green sheets of predetermined numbers are stacked, and the external protection layer 8a shown in FIG. 1 is formed thereon.

Next, on this external protection layer 8a, the internal electrode layer paste is printed in a predetermined pattern, and a green internal electrode layer 4 is formed. Similarly, a green internal electrode layer 6 is formed on another external protection layer 8a.

The interlayer nonlinear resistor layer 8 formed by stacking the predetermined numbers of the green sheets is sandwiched by these so that the internal electrode layers 4 and 6 are opposed against each other and the end portions thereof are exposed to surfaces; thereby formed stack is obtained, it is pressed with heating to be adhered by pressure, then cutting it to a predetermined shape so that a green chip is obtained.

Next, this green chip is subjected to binder removal treatment and then is fired; thereby a sintered body (element body 10) is produced.

The binder removal treatment of the green chip can be carried out under normal conditions. For example, in the air atmosphere, a temperature rising rate is 5 to 300° C./hour or so, a holding temperature is 180 to 400° C. or so, and a temperature holding time is 0.5 to 24 hours or so.

The firing of the green chip can be carried out under the normal condition. For example, in the air atmosphere, a temperature rising rate is 50 to 500° C./hour or so, a holding temperature is 1000 to 1400° C. or so, a temperature holding time is 0.5 to 8 hours or so, and a cooling rate is 50 to 500° C./hour or so. When the holding temperature is too low, the densification becomes insufficient, and when it is too high, the electrodes tend to break due to the abnormal sintering of the internal electrodes.

An end face polishing is conducted to the sintered body (element body 10) obtained as above, for example, by barrel polishing or sand blast or so, and thus it is baked after the external terminal electrode paste is coated on, thereby the external terminal electrodes 12 and 14 are formed. The baking condition of the external terminal electrode paste is, preferably, for example, in the air atmosphere, at 600 to 900° C. or so for 10 minutes to 1 hour or so.

Thus-produced multilayer chip varistor 2 of the present embodiment produced is, for example, connected to the high speed transmission circuit or so, and used to absorb or remove the external surge (the abnormal voltage) such as the static electricity or so, or a noise; and used to protect the circuits or so.

The Second Embodiment

A nonlinear resistor composition according to the second embodiment is different from the above nonlinear resistor composition according to the first embodiment in only kinds of component constituting subcomponents. Hence, other constitutions are the same as the nonlinear resistor composition of the first embodiment.

Herein below, the constitution differing from that of the first embodiment will be only described and the explanation of common constitution will be omitted.

The nonlinear resistor ceramic composition according to the present embodiment includes a zinc oxide as a main component; and an oxide of Co, an oxide of Sr, an oxide of R, an oxide of Si, and a calcium zirconate as subcomponents.

Calcium zirconate ($CaZrO_3$) has an effect to suppress the grain growth of grains, and this effect is larger than that of the oxide of Si. A content of the calcium zirconate with respect to 100 mol of zinc oxide in terms of $CaZrO_3$ is, more than 0.01 at. % and less than 10 at. %, preferably 0.05 to 5 at. %, and more preferably 0.05 to 1 at. %.

When the content of the calcium zirconate is too little, the abnormal growth of the grains occurs, and a size of the grains becomes non-uniformly. As a result, good varistor characteristic tends not to be obtained. When the content of calcium zirconate is too much, the varistor voltage tends to become large.

Note that, since both the oxide of Si and calcium zirconate have the effect to suppress the grain growth of the grains, the abnormal grain growth can be prevented if either one is included in appropriate range.

The nonlinear resistor composition according to the present embodiment can have good various characteristics with suppressing the grain growth of the grains, and moreover can reduce deviations of the characteristics thereof, by including particularly the oxide of Si and calcium zirconate.

Hereinabove, the embodiment of the present invention has been described; however, the present invention is not to be limited to such embodiments at all, and various modifications can be made within the scope of the present invention.

For example, in the first and second embodiments, the multilayer chip varistor is explained as an example of an electronic component according to the present invention; however the electronic component according to the present invention is not limited to the multilayer chip varistor, and it may be any as far as it has the nonlinear resistor layer constituted by the nonlinear resistor ceramic composition having the above compositions.

Also, the present invention is not limited to the multilayer chip varistor having only one pair of the internal electrode layer shown in FIG. 1. In FIG. 1, the varistor has only one pair of the internal electrode layer; however plurality of pairs of the internal electrodes may be stacked in it, or it may be the multilayer chip varistor in which many internal electrodes are stacked.

EXAMPLES

Hereinafter, the present invention will be described based on the detailed examples; however the present invention is not limited to these examples.

Example 1

First, a material of the main component (ZnO) and materials of subcomponents were prepared. As for the materials of the subcomponents, oxides, carbonates, hydroxides of the carbonates and the like were used.

Next, these materials were weighed so that the compositions after firing became the amounts shown in Table 1 with respect to 100 mol of zinc oxide as the main component; then organic binder, organic solvent and plasticizer were added to these materials and are wet-mixed for about 20 hours by the ball mill; thereby a slurry was prepared.

The green sheet having the thickness of 30 μm was formed on the PET film by the doctor blade method using the slurry; and on the formed green sheet, the paradium paste was printed by the screen printing so that it became desired pattern, and then dried, thereby the internal electrode 4 shown in FIG. 1 was formed. Next, the internal electrode 6 shown in FIG. 1 was formed similarly.

Next, the external protection layer 8a to be the outer most layer was formed by stacking a plurality of the green sheets having the same composition.

Then, these were heated and adhered by pressure, then cut into a predetermined chip shape; thereby a green chip was made.

This green chip was subjected to the binder removal treatment under the conditions of 350° C. for 2 hours, and then fired in the air atmosphere at 1175° C. for 2 hours; thereby a sintered body as the multilayer chip varistor element was obtained.

Next, the electrode paste including mainly Ag was coated to the both ends of the obtained sintered body, and then it is baked at 800° C. so that the terminal electrodes 12 and 14 are formed. Thereby, a multilayer chip varistor having constitution of cross section shown in FIG. 1 was obtained. A size of the obtained varistor was 3.2 min×1.6 mm×0.6 mm, a thickness of a nonlinear resistor layer was 65 μm, and the number of the nonlinear resistor layer sandwiched by the internal electrode layers was 1. Also, the area where the internal electrode layers overlap was 1.3 $mm^2$.

By using the obtained varistor samples, a varistor voltage, a nonlinear coefficient and a capacitance were measured.
(Varistor Voltage)

The varistor sample was connected to DC constant voltage power supply and voltage between both electrodes of the varistor sample is measured using voltmeter with measuring the electrical current flowing in the varistor sample using amperemeter; thereby the varistor voltage ($V_{1mA}$) was obtained. Specifically, when the electrical current flowing in the varistor samples was 1 mA, the voltage between the electrodes of the varistor sample was measured by the voltmeter, and the value was determined as the varistor voltage.

(CV Product)

The CV product was obtained by calculating the varistor voltage (V) and the capacitance (C) obtained in the above. The smaller the CV product is, the more preferable. The results are shown in Table 1.

TABLE 1

| Sample No. | Co [at. %] | Sr [at. %] | Pr [at. %] | Si [at. %] | Varistor voltage $V_{1mA}$ | Nonlinear coefficient $\alpha$ | C (at 1 MHz) pF | CV product $C*V_{1mA}$ |
|---|---|---|---|---|---|---|---|---|
| *1 | 0.05 | 0.5 | 0.5 | 0.05 | Below the measuring limit | — | — | — |
| 2 | 0.1 | 0.5 | 0.5 | 0.05 | 19 | 17 | 70 | 1330 |
| 3 | 1 | 0.5 | 0.5 | 0.05 | 29 | 18 | 42 | 1218 |
| 4 | 5 | 0.5 | 0.5 | 0.05 | 37 | 16 | 32 | 1184 |
| 5 | 10 | 0.5 | 0.5 | 0.05 | 40 | 15 | 34 | 1360 |
| 6 | 15 | 0.5 | 0.5 | 0.05 | 49 | 15 | 29 | 1421 |
| 7 | 20 | 0.5 | 0.5 | 0.05 | 58 | 14 | 26 | 1508 |
| *8 | 30 | 0.5 | 0.5 | 0.05 | 68 | 8 | 25 | 1700 |
| *9 | 50 | 0.5 | 0.5 | 0.05 | >100 | — | — | — |
| *10 | 1 | 0.05 | 0.5 | 0.05 | 63 | 20 | 34 | 2142 |
| 11 | 1 | 0.1 | 0.5 | 0.05 | 43 | 19 | 37 | 1591 |
| 3 | 1 | 0.5 | 0.5 | 0.05 | 29 | 18 | 42 | 1218 |
| 12 | 1 | 1 | 0.5 | 0.05 | 26 | 15 | 49 | 1274 |
| 13 | 1 | 5 | 0.5 | 0.05 | 19 | 14 | 75 | 1425 |
| 14 | 1 | 10 | 0.5 | 0.05 | 15 | 10 | 99 | 1485 |
| *15 | 1 | 20 | 0.5 | 0.05 | — | — | — | — |
| *16 | 1 | 0.5 | 0.01 | 0.05 | Below the measuring limit | — | — | — |
| 17 | 1 | 0.5 | 0.1 | 0.05 | 36 | 15 | 45 | 1620 |
| 3 | 1 | 0.5 | 0.5 | 0.05 | 29 | 18 | 42 | 1218 |
| 18 | 1 | 0.5 | 1 | 0.05 | 39 | 19 | 45 | 1755 |
| 19 | 1 | 0.5 | 5 | 0.05 | 50 | 19 | 43 | 2150 |
| 20 | 1 | 0.5 | 10 | 0.05 | 72 | 20 | 40 | 2880 |
| *21 | 1 | 0.5 | 20 | 0.05 | >100 | — | — | — |
| *22 | 1 | 0.5 | 0.5 | 0.01 | — | — | — | — |
| 3 | 1 | 0.5 | 0.5 | 0.05 | 29 | 18 | 42 | 1218 |
| 23 | 1 | 0.5 | 0.5 | 0.1 | 31 | 18 | 40 | 1240 |
| 24 | 1 | 0.5 | 0.5 | 0.5 | 45 | 21 | 38 | 1710 |
| 25 | 1 | 0.5 | 0.5 | 1 | 65 | 24 | 35 | 2275 |
| 26 | 1 | 0.5 | 0.5 | 5 | — | — | — | — |
| *27 | 1 | 0.5 | 0.5 | 10 | — | — | — | — |

The content with respect to 100 mol of zinc oxide is shown
*indicates the comparative example of the present invention The unit was "V". In the present example, 100V or less was considered as good. The results are shown in Table 1.

(Nonlinear Coefficient ($\alpha$))

The nonlinear coefficient shows the relation between the electrical current and the voltage applied between the electrodes of the varistor sample when the electrical current flowing in the varistor sample changes from 0.1 mA to 1 mA, and was calculated from below equation. In the present example, 14 or more was considered as good. The results are shown in Table 1.

$$\alpha = \log(I_1/I_{0.1})/\log(V_1/V_{0.1}) = 1/\log(V_1/V_{0.1})$$

Note that, $V_1$ indicates a varistor voltage at the time when $I_1$ (=1 mA) of the electrical current flows in the varistor sample; and $V_{0.1}$ indicates a varistor voltage at the time when $I_{0.1}$ (=0.1 mA) of the electrical current flows in the varistor sample. The larger the nonlinear coefficient "$\alpha$" is, the more superior in the varistor characteristic.

(Capacitance)

For varistor samples, the capacitance (C) was measured (the unit: pF), under the conditions of 1 MHz of the frequency, 1 Vrms of the input signal level (the measured voltage) using digital LCR meter (made by YHP corporation 4274A) at reference temperature of 25° C. In the present example, 100 or less was considered as good. The results are shown in Table 1.

As shown in Table 1, when the content of the subcomponents were out of the range of the present invention (sample numbers 1, 8 to 10, 15, 16, 21, 22 and 27), it was confirmed that at least one of the varistor voltage, the nonlinear coefficient, the capacitance and the CV product tends to be deteriorated.

Note that, the sample number 15 had too much content of the oxide of Sr; hence the oxide of Sr reacted with zinc oxide as the main component and melted thus the characteristics were not evaluated. Also, the sample number 22 had too little content of the oxide of Si; hence excess grain growth occurred thus the characteristics were not obtained. In regard to the sample number 26, the nonlinear resistor layer was formed by sheet method; thus the characteristics were not obtained, however, for example, if the sample number 26 was the varistor having the nonlinear resistor layer formed by the compression molding or so, the desired characteristics can be obtained.

On the contrary to this, when the contents of the subcomponents were within the range of the present invention (sample numbers 2 to 7, 11 to 14, 17 to 20 and 23 to 25), it was confirmed that all of the varistor voltage, the nonlinear coefficient, the capacitance and the CV product were good.

Example 2

Multilayer chip varistor samples were produced as similar with the example 1 and the above mentioned evaluations were carried out except that the following subcomponents were added: with respect to 100 mol of ZnO, 0.5 at. % of the oxide of Co in terms of Co; 0.5 at. % of the oxide of Sr in terms of Sr; 0.1 at. % of the oxide of Pr in terms of Pr; 0.05 at. % of the oxide of Si in terms of Si; and $Al_2O_3$ in amounts shown in Table 2 in terms of Al. The results are shown in Table 2.

Figure 2:
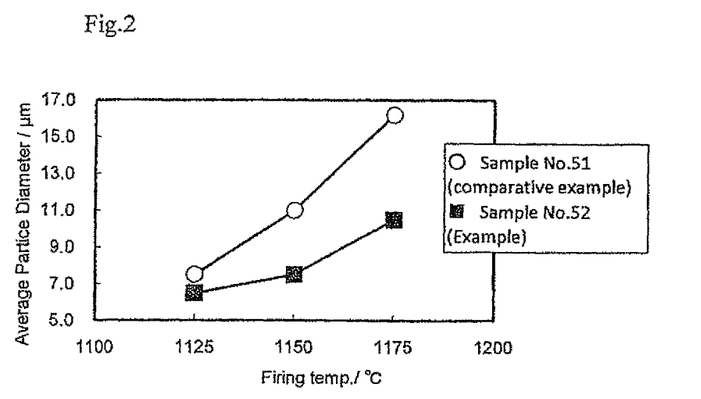
FIG. 2 is a graph showing the relation between firing temperatures and average particle diameters of grains of samples according to the examples and the comparative examples of the present invention.

The average value of the obtained particle diameters was determined as the average particle diameter. Note that, the number of grains whose particle diameter was calculated was 20. The results are shown in FIG. 2.

Furthermore, in regard to the sample numbers 51 and 52, the varistor voltage, the nonlinear coefficient, and the capaci-

TABLE 2

| Sample No. | Co [at. %] | Sr [at. %] | Pr [at. %] | Si [at. %] | Al [at. %] | Varistor voltage $V_{1mA}$ V | Nonlinear coefficient α | C (at 1 MHz) pF | CV product $C*V_{1mA}$ |
|---|---|---|---|---|---|---|---|---|---|
| 30 | 0.5 | 0.5 | 0.1 | 0.05 | 0 | 28 | 16 | 47 | 1316 |
| *1 | 0.5 | 0.5 | 0.1 | 0.05 | 0.0002 | 25 | 16 | 60 | 1500 |
| *32 | 0.5 | 0.5 | 0.1 | 0.05 | 0.0004 | 24 | 16 | 75 | 1800 |
| *33 | 0.5 | 0.5 | 0.1 | 0.05 | 0.0008 | 22 | 17 | 95 | 2090 |
| *34 | 0.5 | 0.5 | 0.1 | 0.05 | 0.0020 | 20 | 18 | 160 | 3200 |
| *35 | 0.5 | 0.5 | 0.1 | 0.05 | 0.0039 | 19 | 16 | 180 | 3420 |
| *36 | 0.5 | 0.5 | 0.1 | 0.05 | 0.0055 | 17 | 16 | 200 | 3400 |

The content with respect to 100 mol of zinc oxide is shown
*indicates the comparative example of the present invention As shown in Table 2, when Al was included, even when the contents were very little, the capacitance became significantly large, and as a result, the CV product became large, which was not preferable.

Example 3

Multilayer chip varistor sample (sample number 51) was produced as similar with the example 1 except that firing temperatures were set to 1125° C., 1150° C. and 1175° C., and the following subcomponents were added: with respect to 100 mol of ZnO, 1.2 at. % of the oxide of Co in terms of Co; 0.5 at. % of the oxide of Sr in terms of Sr; and 0.5 at. % of the oxide of Pr in terms of Pr. Also, multilayer chip varistor sample (sample number 52) was produced as similar with the example 1 except that firing temperatures were set to 1125° C., 1150° C., and 1175° C., and the following subcomponents were added: with respect to 100 mol of ZnO, 1.2 at. % of the oxide of Co in terms of Co; 0.5 at. % of the oxide of Sr in terms of Sr; 0.5 at. % of the oxide of Pr in terms of Pr; and 0.028 at. % of the oxide of Si in terms of Si.

That is, the difference between the sample number 51 (the comparative example) and the sample number 52 (the example) is whether the oxide of Si is included or not. In regard to the sample numbers 51 and 52, the average particle diameter was measured by the method shown in below.

The measurement of the average particle diameter was carried out by cutting the varistor sample so that cross section of the nonlinear resistor layer appears, and the cross section was observed by a scanning electron microscope (SEM) so as to take SEM photographs. An image processing was performed to the SEM photograph by software so as to distinguish a boundary of grains and calculate an area of each grain. Then, the calculated area of grains was converted to circle equivalent diameter so that a particle diameter was calculated.

tance were measured to 10 samples, respectively, and deviations of the measured values were evaluated as C.V. value (coefficient of variation). The measuring condition was as similar with the example 1. Also, from the measured value of the varistor voltage and the capacitance, the deviation of the CV product was also evaluated as C.V. value.

Figure 3:
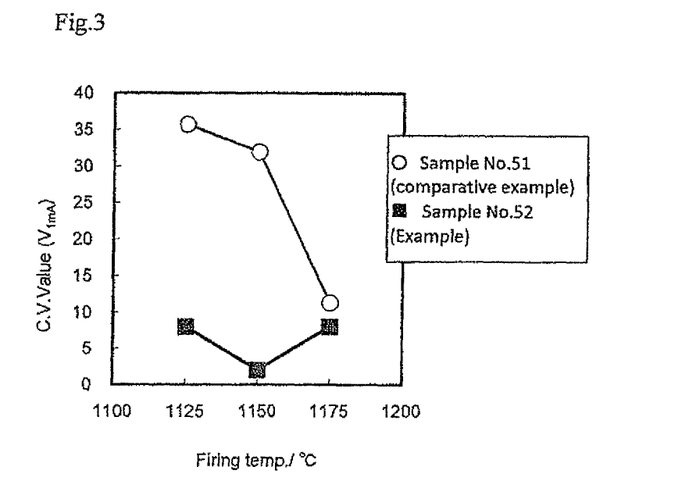
FIG. 3 is a graph showing the relation between firing temperatures and C.V. values of varistor voltage of the samples according to the examples and the comparative examples of the present invention.
Figure 4:
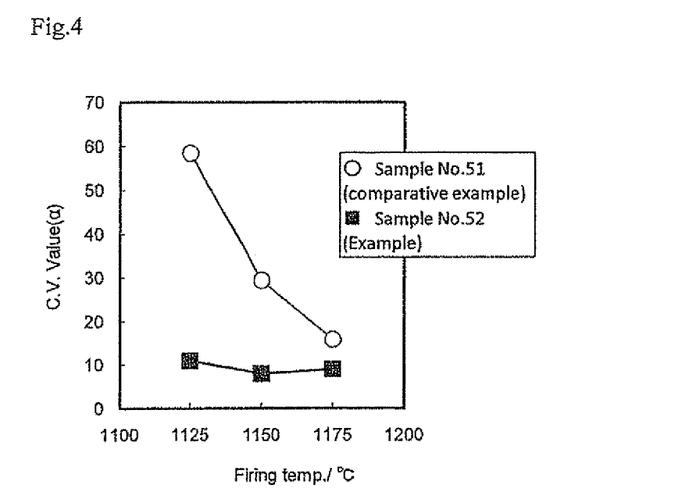
FIG. 4 is a graph showing the relation between firing temperatures and the C.V. values of nonlinear coefficient of the samples according to the examples and the comparative examples of the present invention.
Figure 5:
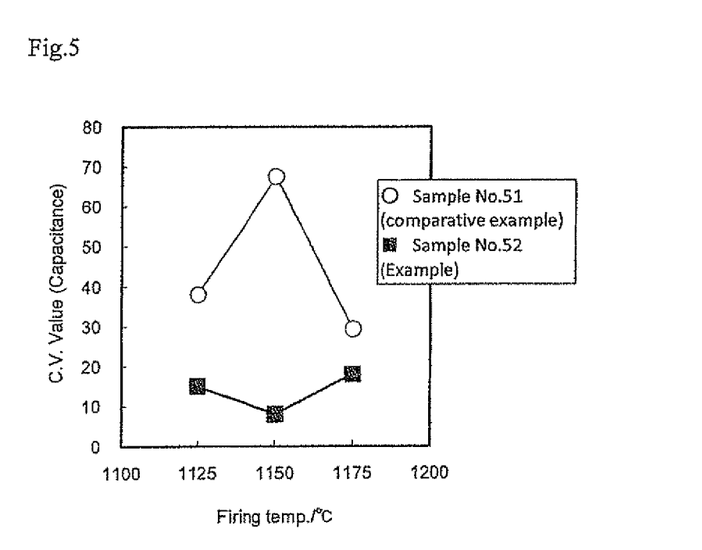
FIG. 5 is a graph showing the relation between firing temperatures and the C.V. values of capacitance of the samples according to the examples and the comparative examples of the present invention.
Figure 6:
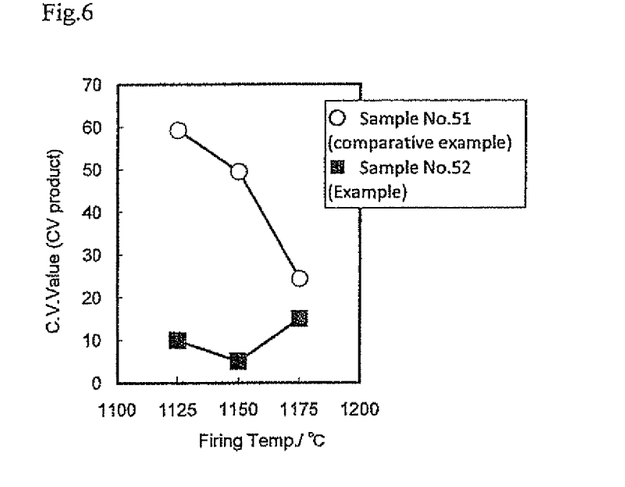
FIG. 6 is a graph showing the relation between firing temperatures and the C.V. values of the CV product of the samples according to the examples and the comparative examples of the present invention.

The C.V. values of the varistor voltage is shown in FIG. 3, the C.V. values of the nonlinear coefficient is shown in FIG. 4, the C.V. values of the capacitance is shown in FIG. 5, the C.V. values of the CV product is shown in FIG. 6. Note that, the C.V. value is expressed by the below equation and the larger the C.V. value is, the larger the deviation is.

*C.V.* value=(standard deviation/average value)×100

As shown in FIG. 2, it was confirmed that by including the oxide of Si, the grain growth of the grains can be suppressed. Also, the effect of suppressing the grain growth was larger as the firing temperature rises.

As shown in FIGS. 3 to 6, it was confirmed that by including the oxide of Si, deviations of the characteristics can be reduced. Also, the effect of reducing the deviations of the characteristics was larger as the firing temperature becomes low.

Example 4

As for the material of the subcomponent, the materials of the subcomponents shown in Table 3 were prepared. Except that these materials were weighed so that the composition after firing became the amounts shown in Table 3 with respect to 100 mol of zinc oxide as the main component, the multilayer chip varistor sample was produced as similar with the example 1, and the above mentioned evaluations were carried out. The results are shown in Table 3.

TABLE 3

| Sample No. | Co [at. %] | Sr [at. %] | Pr [at. %] | Si [at. %] | $CaZrO_3$ [at. %] | Varistor voltage $V_{1mA}$ V | Nonlinear coefficient α | C (at 1 MHz) PF | CV product $C*V_{1mA}$ |
|---|---|---|---|---|---|---|---|---|---|
| *61 | 0.05 | 0.5 | 0.5 | 0.05 | 0.05 | Below the measuring | — | — | — |

TABLE 3-continued

| Sample No. | Co [at. %] | Sr [at. %] | Pr [at. %] | Si [at. %] | CaZrO₃ [at. %] | Varistor voltage $V_{1mA}$ V | Nonlinear coefficient α | C (at 1 MHz) PF | CV product $C*V_{1mA}$ |
|---|---|---|---|---|---|---|---|---|---|
| 62 | 0.1 | 0.5 | 0.5 | 0.05 | 0.05 | 18 | 18 | 80 | 1440 |
| 63 | 1 | 0.5 | 0.5 | 0.05 | 0.05 | 28 | 16 | 47 | 1316 |
| 64 | 5 | 0.5 | 0.5 | 0.05 | 0.05 | 35 | 16 | 37 | 1295 |
| 65 | 10 | 0.5 | 0.5 | 0.05 | 0.05 | 39 | 16 | 33 | 1287 |
| 66 | 15 | 0.5 | 0.5 | 0.05 | 0.05 | 50 | 15 | 28 | 1400 |
| 67 | 20 | 0.5 | 0.5 | 0.05 | 0.05 | 60 | 14 | 25 | 1500 |
| *68 | 30 | 0.5 | 0.5 | 0.05 | 0.05 | 70 | 10 | 23 | 1610 |
| *69 | 50 | 0.5 | 0.5 | 0.05 | 0.05 | >100 | — | — | — |
| *70 | 1 | 0.05 | 0.5 | 0.05 | 0.05 | 60 | 20 | 34 | 2040 |
| 71 | 1 | 0.1 | 0.5 | 0.05 | 0.05 | 45 | 18 | 37 | 1665 |
| 63 | 1 | 0.5 | 0.5 | 0.05 | 0.05 | 28 | 16 | 47 | 1316 |
| 72 | 1 | 1 | 0.5 | 0.05 | 0.05 | 24 | 15 | 55 | 1320 |
| 73 | 1 | 5 | 0.5 | 0.05 | 0.05 | 18 | 15 | 72 | 1296 |
| 74 | 1 | 10 | 0.5 | 0.05 | 0.05 | 15 | 14 | 85 | 1275 |
| *75 | 1 | 20 | 0.5 | 0.05 | 0.05 | — | — | — | — |
| *76 | 1 | 0.5 | 0.01 | 0.05 | 0.05 | Below the measuring | — | — | — |
| 77 | 1 | 0.5 | 0.1 | 0.05 | 0.05 | 33 | 14 | 55 | 1815 |
| 63 | 1 | 0.5 | 0.5 | 0.05 | 0.05 | 28 | 16 | 47 | 1316 |
| 78 | 1 | 0.5 | 1 | 0.05 | 0.05 | 35 | 17 | 46 | 1610 |
| 79 | 1 | 0.5 | 5 | 0.05 | 0.05 | 45 | 18 | 44 | 1980 |
| 80 | 1 | 0.5 | 10 | 0.05 | 0.05 | 70 | 19 | 40 | 2800 |
| *81 | 1 | 0.5 | 20 | 0.05 | 0.05 | >100 | — | — | — |
| *82 | 1 | 0.5 | 0.5 | 0.01 | 0.05 | 25 | 14 | 50 | 1250 |
| 63 | 1 | 0.5 | 0.5 | 0.05 | 0.05 | 28 | 16 | 47 | 1316 |
| 83 | 1 | 0.5 | 0.5 | 0.1 | 0.05 | 28 | 16 | 46 | 1288 |
| 84 | 1 | 0.5 | 0.5 | 0.5 | 0.05 | 40 | 20 | 40 | 1600 |
| 85 | 1 | 0.5 | 0.5 | 1 | 0.05 | 60 | 25 | 30 | 1800 |
| 86 | 1 | 0.5 | 0.5 | 5 | 0.05 | — | — | — | — |
| *87 | 1 | 0.5 | 0.5 | 10 | 0.05 | — | — | — | — |
| *88 | 1 | 0.5 | 0.5 | 0.05 | 0.01 | 28 | 16 | 46 | 1288 |
| 63 | 1 | 0.5 | 0.5 | 0.05 | 0.05 | 28 | 16 | 47 | 1316 |
| 89 | 1 | 0.5 | 0.5 | 0.05 | 0.1 | 32 | 16 | 45 | 1440 |
| 90 | 1 | 0.5 | 0.5 | 0.05 | 0.5 | 37 | 16 | 43 | 1591 |
| 91 | 1 | 0.5 | 0.5 | 0.05 | 1 | 42 | 17 | 42 | 1764 |
| 92 | 1 | 0.5 | 0.5 | 0.05 | 5 | 60 | 18 | 30 | 1800 |
| *93 | 1 | 0.5 | 0.5 | 0.05 | 10 | >100 | — | — | — |

The content with respect to 100 mol of zinc oxide is shown
*indicates the comparative example of the present invention As shown in Table 3, when the contents of the subcomponents were out of the range of the present invention (sample numbers 61, 68 to 70, 75, 76, 81, 87 and 93), it was confirmed that at least one of the varistor voltage, the nonlinear coefficient, the capacitance and the CV product were deteriorated.

Note that, the sample number 75 had too much content of the oxide of Sr; hence the oxide of Sr reacted with zinc oxide as the main component and melted thus the characteristics were not evaluated. Also the sample numbers 82 and 88 has appropriate content of at least one of the oxide of Si or calcium zirconate; hence abnormal grain growth did not occur thus good characteristics were obtained. However, the sample number 82 could not reduce deviations of the characteristics, and the sample number 88 did not have enough effect to suppress the grain growth. In regard to the sample number 86, the nonlinear resistor layer was formed by sheet method thus the characteristics were not obtained, however, for example, if the sample number 86 was the varistor having the nonlinear resistor layer formed by the compression molding or so, the desired characteristics can be obtained.

On the contrary to this, when the contents of the subcomponents were within the range of the present invention (sample numbers 62 to 67, 71 to 74, 77 to 80, 83 to 85 and 89 to 92), it was confirmed that all of the varistor voltage, the nonlinear coefficient, the capacitance, and the CV product were good.

Example 5

The sample number 51 of the example 3 was set as the sample number 101. Also, multilayer chip varistor sample (the sample number 102) was produced as similar with the example 1 except that firing temperatures were set to 1125° C., 1150° C., 1175° C. and 1200° C., and the following subcomponents were added: with respect to 100 mol of ZnO, 1.2 at. % of the oxide of Co in terms of Co; 0.5 at. % of the oxide of Sr in terms of Sr; 0.5 at. % of the oxide of Pr in terms of Pr; and 0.06 at. % of calcium zirconate in terms of CaZrO₃.

Figure 7:
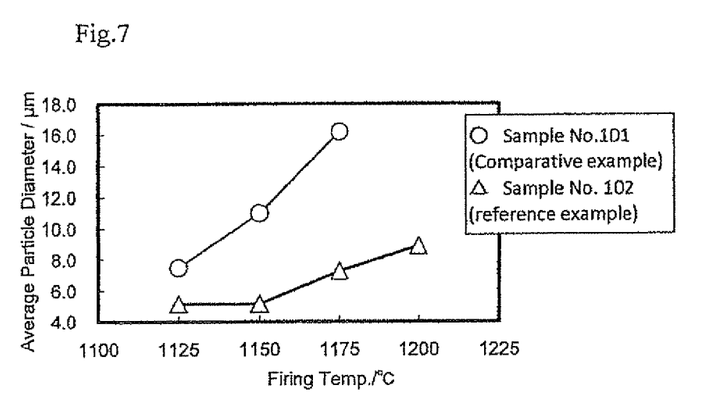
FIG. 7 is a graph showing the relation between firing temperatures and average particle diameters of grains of the samples according to the reference examples and the comparative examples of the present invention.

That is, the sample number 101 is the same sample as the sample number 51 of the example 3; and the difference between the sample number 101 (the comparative example) and the sample number 102 (the reference example) is whether the calcium zirconate is included or not. In regard to the sample numbers 101 and 102, the average particle diameter was measured as similar with the example 3. The results are shown in FIG. 7.

Further, multilayer chip varistor sample (the sample number 103: the example) was produced as similar with the example 1 except that firing temperatures were set to 1125° C., 1150° C. and 1175° C., and the following subcomponents were added: with respect to 100 mol of ZnO, 1.2 at. % of the oxide of Co in terms of Co; 0.5 at. % of the oxide of Sr in terms of Sr; 0.5 at. % of the oxide of Pr in terms of Pr; 0.028 at. % of the oxide of Si in terms of Si; and 0.06 at. % of calcium zirconate in terms of CaZrO₃.

Then, in regard to the sample numbers 101, 102, and 103, the varistor voltage, the nonlinear coefficient and the capacitance were measured from 10 samples, respectively, and the deviation of the measured values thereof was evaluated as the C.V. value (coefficient of variation). The measuring condition was as similar with the example 1. Also, from the measured value of the varistor voltage and the capacitance, the deviation of the CV product was also evaluated as the C.V. values.

Figure 8:
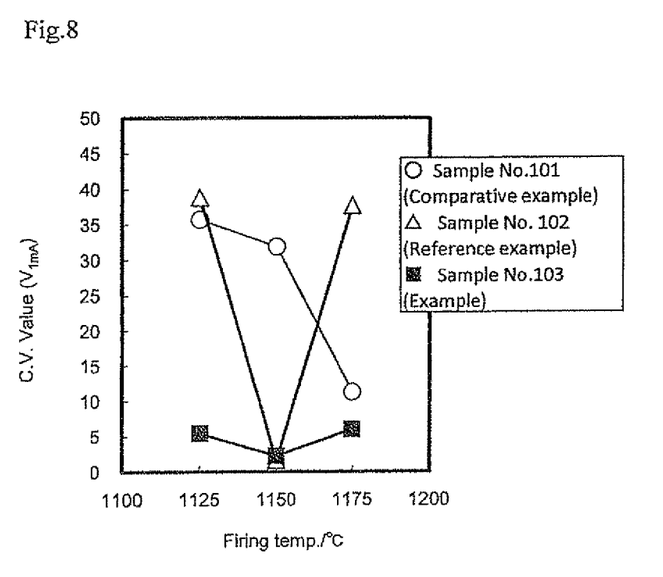
FIG. 8 is a graph showing the relation between firing temperatures and the C.V. values of varistor voltage of the samples according to the examples, the reference examples and the comparative examples of the present invention.
Figure 9:
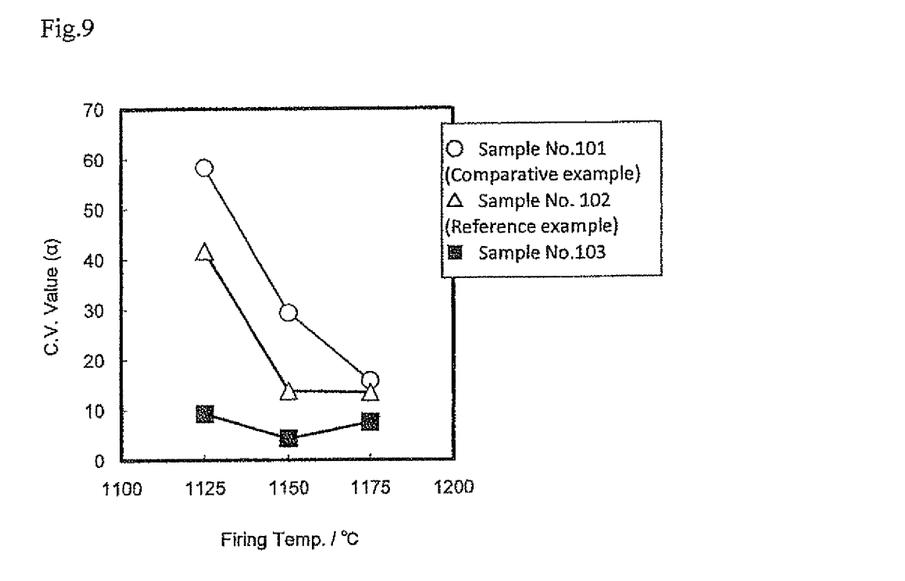
FIG. 9 is a graph showing the relation between firing temperatures and the C.V. values of the nonlinear coefficient of the samples according to the examples, the reference examples and the comparative examples of the present invention.
Figure 10:
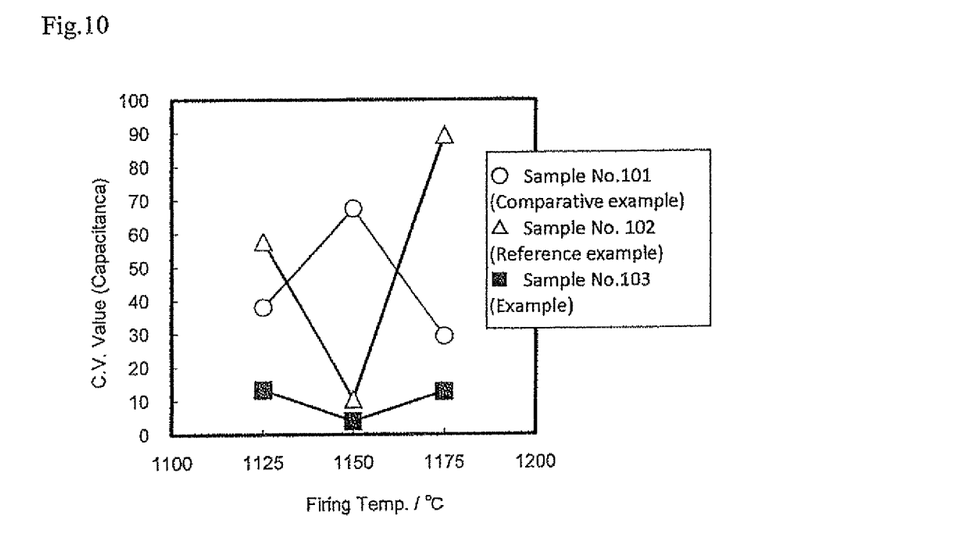
FIG. 10 is a graph showing the relation between firing temperatures and the C.V. values of the capacitance of the samples according to the examples, the reference examples and the comparative examples of the present invention.
Figure 11:
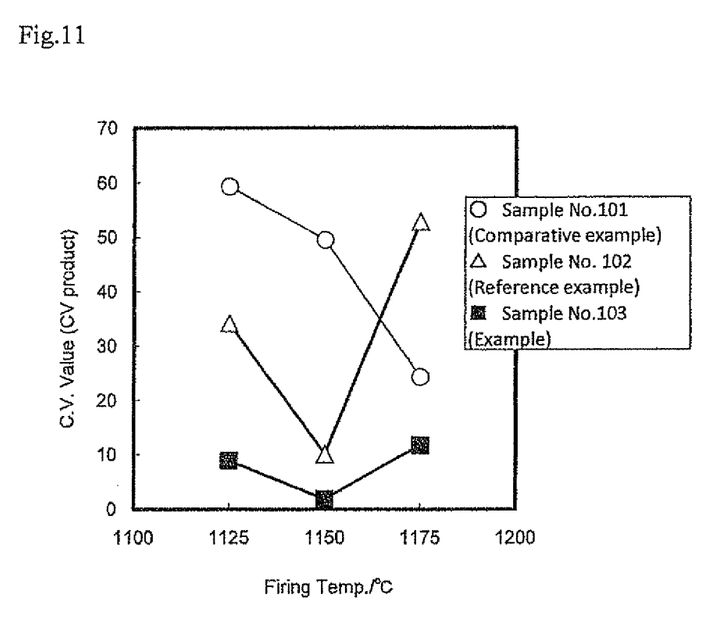
FIG. 11 is a graph showing the relation between firing temperatures and the C.V. values of the CV product of the samples according to the examples, the reference examples and the comparative examples of the present invention.

The C.V. values of the varistor voltage is shown in FIG. 8, the C.V. values of the nonlinear coefficient is shown in FIG. 9, the C.V. values of the capacitance is shown in FIG. 10, the C.V. values of the CV product is shown in FIG. 11. Note that, the C.V. value is expressed by the below equation and the larger the C.V. value is, the larger the variation is.

*C.V.* value=(standard deviation/average value)×100

As shown in FIG. 7, it was confirmed that by including calcium zirconate, the grain growth of the grains can be suppressed. Also, the effect of suppressing the grain growth was larger as the firing temperature rises.

As shown in FIGS. 8 to 11, it was confirmed that by including only calcium zirconate, it is not enough to reduce the deviations of the characteristics. However, by further including the oxide of Si, it was confirmed that the deviations of the characteristics can be reduced.

The invention claimed is:

1. A nonlinear resistor ceramic composition comprising:
a zinc oxide as a main component; and
as subcomponents, with respect to 100 mol of said zinc oxide,
an amount of from more than 0.05 at. % to less than 30 at. % of an oxide of Co in terms of Co;
an amount of from more than 0.05 at. % to less than 20 at. % of an oxide of Sr in terms of Sr;
an amount of from not less than 0.1 at. % and not more than 5 at. % of an oxide of R in terms of R, where R is at least one element selected from the group consisting of Y, La, Ce, Pr, Nd, Sm, Eu, Gd, Tb, Dy, Ho, Er, Tm, Yb and Lu, and
an amount of from 0.05 at. % to 0.5 at. % of an oxide of Si in terms of Si,
wherein the nonlinear resistor ceramic composition does not comprise Al, Ga, and In,
the nonlinear resistor ceramic composition is used for a nonlinear resistor layer of a multilayer chip varistor having at least one pair of internal electrode layers,
a varistor voltage of the nonlinear resistor ceramic composition is 100V or less, and
the nonlinear resistor ceramic composition is a semiconductor.

2. A nonlinear resistor ceramic composition comprising:
a zinc oxide as a main component; and
as subcomponents, with respect to 100 mol of said zinc oxide,
an amount of from more than 0.05 at. % to less than 30 at. % of an oxide of Co in terms of Co;
an amount of from more than 0.05 at. % to less than 20 at. % of an oxide of Sr in terms of Sr;
an amount of from more than 0.01 at. % to less than 20 at. % of an oxide of R in terms of R, where R is at least one element selected from the group consisting of Y, La, Ce, Pr, Nd, Sm, Eu, Gd, Tb, Dy, Ho, Er, Tm, Yb and Lu;
an amount of from more than 0.01 at. % to less than 10 at. % of an oxide of Si in terms of Si; and
an amount of from more than 0.01 at. % to less than 10 at. % of calcium zirconate in terms of $CaZrO_3$,
wherein the nonlinear resistor ceramic composition is used for a nonlinear resistor layer of a multilayer chip varistor having at least one pair of internal electrode layers,
a varistor voltage of the nonlinear resistor ceramic composition is 100V or less, and
the nonlinear resistor ceramic composition is a semiconductor.

3. An electronic component comprising a nonlinear resistor layer constituted by the nonlinear resistor ceramic composition as set forth in claim 1.

4. An electronic component comprising a nonlinear resistor layer constituted by the nonlinear resistor ceramic composition as set forth in claim 2.

5. A chip varistor comprising a nonlinear resistor layer, wherein the nonlinear resistor layer comprises the nonlinear resistor ceramic composition as set forth in claim 1.

6. A chip varistor comprising a nonlinear resistor layer, wherein the nonlinear resistor layer comprises the nonlinear resistor ceramic composition as set forth in claim 2.

* * * * *